United States Patent
Sen et al.

(10) Patent No.: US 12,050,980 B2
(45) Date of Patent: Jul. 30, 2024

(54) FORECASTING IN MULTIVARIATE IRREGULARLY SAMPLED TIME SERIES WITH MISSING VALUES

(71) Applicant: International Business Machines Corporation, Armonk, NY (US)

(72) Inventors: Prithviraj Sen, San Jose, CA (US); Berthold Reinwald, San Jose, CA (US); Shivam Srivastava, Amherst, MA (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 17/001,482

(22) Filed: Aug. 24, 2020

(65) Prior Publication Data
US 2022/0058465 A1 Feb. 24, 2022

(51) Int. Cl.
*G06N 3/044* (2023.01)
*G06N 3/08* (2023.01)

(52) U.S. Cl.
CPC .............. *G06N 3/044* (2023.01); *G06N 3/08* (2013.01)

(58) Field of Classification Search
CPC ........ G06N 20/00; G06N 20/10; G06N 20/20; G06N 3/00; G06N 3/02; G06N 3/04; G06N 3/044; G06N 3/0455; G06N 3/0464; G06N 3/049; G06N 3/08
See application file for complete search history.

(56) References Cited

U.S. PATENT DOCUMENTS

| | | | |
|---|---|---|---|
| 2019/0378022 A1 | 12/2019 | Wang et al. | |
| 2020/0097810 A1 | 3/2020 | Hetherington et al. | |
| 2020/0356846 A1* | 11/2020 | Saripalli | G16H 10/60 |
| 2020/0401888 A1* | 12/2020 | Gugulothu | G06N 3/047 |
| 2021/0064034 A1* | 3/2021 | Ouyang | G05B 13/0265 |
| 2022/0036239 A1* | 2/2022 | Bhatt | G06F 18/217 |

FOREIGN PATENT DOCUMENTS

| | | |
|---|---|---|
| CN | 110597799 A | 12/2019 |
| WO | 2019208998 A1 | 10/2019 |

OTHER PUBLICATIONS

"Formulation & Interpolation of Time series" Disclosed Anonymously, An IP.com Prior Art Database Technical Disclosure, IP.com No. IPCOM000254424D, IP.com Electronic Publication Date: Jun. 27, 2018, 5 pages.

(Continued)

*Primary Examiner* — Shane D Woolwine
(74) *Attorney, Agent, or Firm* — Andre Adkins

(57) ABSTRACT

In an approach for forecasting in multivariate irregularly sampled time series, a processor receives time series data having one or more missing values. A processor determines, from the time series data, non-missing values present in the time series data. A processor determines, from the time series data, zero or more mask values for the time series data. A processor determines time interval values. A processor inputs the one or more missing values, the non-missing values, the zero or more mask values, and the time interval values into a recurrent neural network. A processor determines a predicted value for the one or more missing values.

20 Claims, 6 Drawing Sheets

(56) References Cited

OTHER PUBLICATIONS

"Modeling Disease Incidence and Progression Using Deep Neural Networks", Disclosed Anonymously, An IP.com Prior Art Database Technical Disclosure, IP.com No. IPCOM000252181D, IP.com Electronic Publication Date: Dec. 20, 2017, 5 pages.
Che et al., "Recurrent Neural Networks for Multivariate Time Series with Missing Values", Scientific Reports, Published Online Apr. 17, 2018, 12 pages, <www.nature.com/Scientificreports>.
Christiano, Lawrence J., "Christopher A. Sims and Vector Autoregressions", The Scandinavian Journal of Economics, vol. 114, No. 4, Dec. 2012, pp. 1082-1104.
De Brower et al., GRU-ODE-Bayes: Continuous modeling of sporadically-observed time series, Proceedings of the 33rd Conference on Neural Information Processing Systems (NeurIPS 2019), Dec. 8-14, 2019, Vancouver, Canada, 22 pages, <arXiv:1905.12374v2 [cs.LG] Nov. 28, 2019>.
Nancy et al., "A bio-statistical mining Approach for Classifying Multivariate Clinical Time Series Data Observed at Irregular Intervals", Expert Systems with Applications, vol. 78, pp. 283-300; 2017, 18 pages.
Srivastava et al., "Forecasting in Multivariate Irregularly Sampled Time Series With Missing Values", arXiv.org > cs > arXiv:2004.03398, Apr. 6, 2020, 13 pages, Evidence of Grace Period Use or Sale, <https://arxiv.org/abs/2004.03398>.
"The Box-Jenkins Method", Chapter 470, NCSS Statistical Software, NCSS.com, 14 pages, downloaded from the Internet on Sep. 14, 2023, <https://www.ncss.com/wp-content/themes/ncss/pdf/Procedures/NCSS/The_Box-Jenkins_Method.pdf>.

* cited by examiner

FORECASTING IN MULTIVARIATE IRREGULARLY SAMPLED TIME SERIES WITH MISSING VALUES

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): Forecasting in Multivariate Irregularly Sampled Time Series with Missing Values, Shivam Srivastava et al., dated Apr. 6, 2020, 13 pages.

BACKGROUND

The present disclosure relates generally to the field of machine learning and artificial neural network, and more particularly to forecasting in multivariate irregularly sampled time series with missing values.

As a part of augmented intelligence and artificial intelligence, machine learning refers to a wide variety of algorithms and methodologies that enable systems to improve their performance over time as machine learning obtains more data and learns from the data. Essentially, machine learning is about recognizing trends from data or recognizing the categories that the data fits in so that when the machine-learned system is presented with new data, machine learning can make proper predictions. Deep learning is a type of machine learning that employs a multi-layer hierarchical neural network architecture and an end-to-end approach to training where the system is trained by a set of input data and desired output with learning happening in the intermediate layers. A recurrent neural network is a class of artificial neural networks where connections between nodes form a directed graph along a temporal sequence. A recurrent neural network can use an internal state (memory) to process variable length sequences of inputs.

SUMMARY

Aspects of an embodiment of the present disclosure disclose an approach forecasting in multivariate irregularly sampled time series. A processor receives time series data having one or more missing values. A processor determines, from the time series data, non-missing values present in the time series data. A processor determines, from the time series data, zero or more mask values for the time series data. A processor determines time interval values. A processor inputs the one or more missing values, the non-missing values, the zero or more mask values, and the time interval values into a recurrent neural network. A processor determines a predicted value for the one or more missing values.

DETAILED DESCRIPTION

The present disclosure is directed to systems and methods for forecasting in multivariate irregularly sampled time series with missing values.

Embodiments of the present disclosure recognize a need to predict future values in an environment where data is at irregularly sampled time intervals. Multivariate data may be spatially correlated but not every variable may be recorded in every snapshot. Moreover, the snapshots may be irregularly sampled in time. Embodiments of the present disclosure disclose using a recurrent neural network, e.g., gated recurrent units, to forecast when the data consists of multivariate timeseries, snapshots are irregularly spaced in time and each snapshot may not report every variable. Embodiments of the present disclosure disclose an approach to forecasting in multivariate, irregularly sampled timeseries data allowing not only forecasting of the values but also forecasting when the next snapshot will occur.

Figure 1:
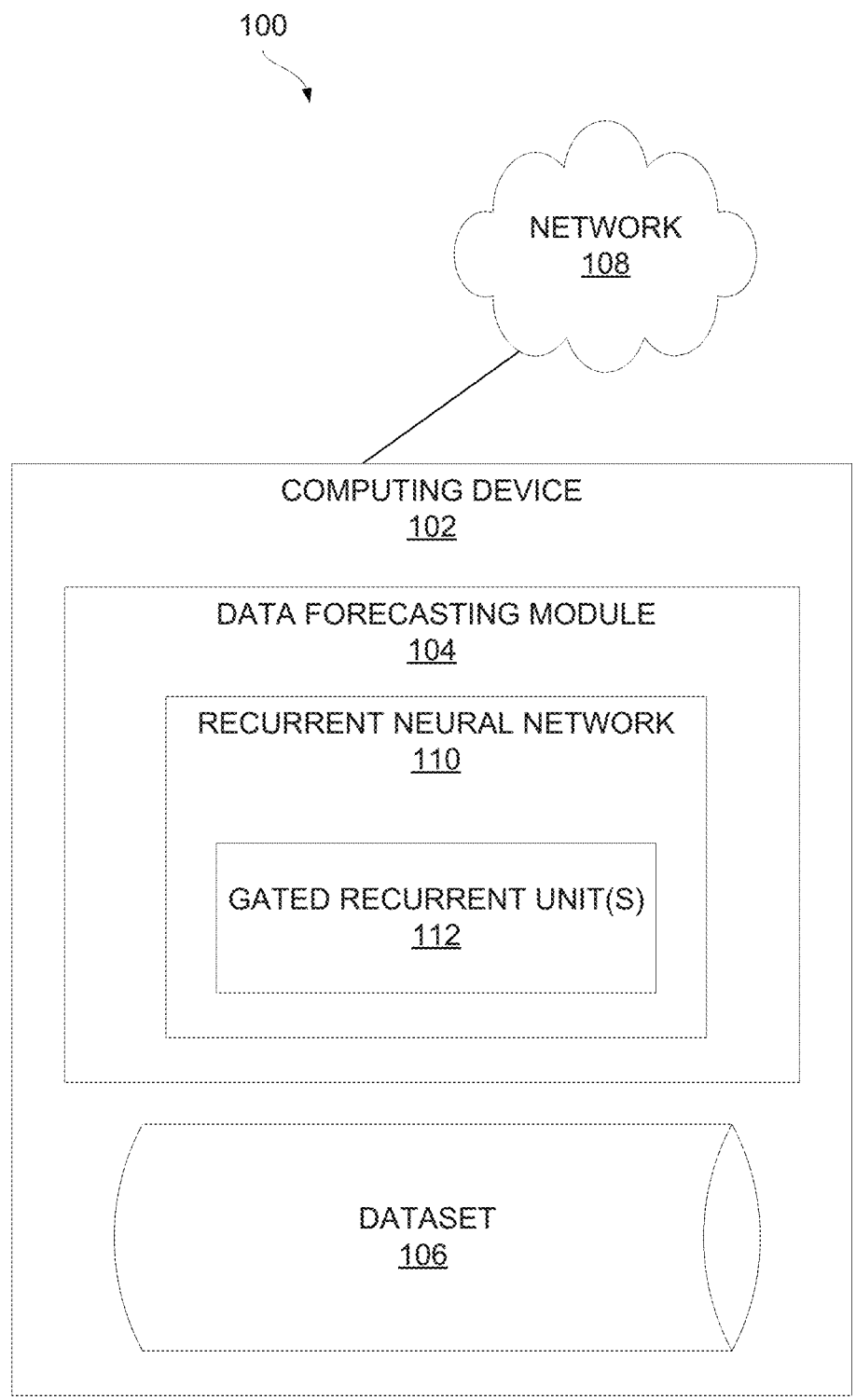
FIG. 1 is a functional block diagram illustrating a time series data forecasting environment, in accordance with an embodiment of the present disclosure.

The present disclosure will now be described in detail with reference to the Figures. FIG. 1 is a functional block diagram illustrating time series data forecasting environment, generally designated 100, in accordance with an embodiment of the present disclosure.

In the depicted embodiment, time series data forecasting environment 100 includes computing device 102 and network 108. In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to data forecasting module 104 and network 108 and is capable of processing program instructions and executing data forecasting module 104, in accordance with an embodiment of the present disclosure. Computing device 102 may include internal and external hardware components, as depicted and described in further detail with respect to FIG. 6.

Further, in the depicted embodiment, computing device 102 includes data forecasting module 104 and dataset 106. In the depicted embodiment, data forecasting module 104 and dataset 106 are located on computing device 102. However, in other embodiments, data forecasting module 104 and dataset 106 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and data forecasting module 104 and dataset 106, in accordance with a desired embodiment of the disclosure.

In one or more embodiments, data forecasting module 104 may be configured to receive time series data. The time series data may have one or more missing values. The time series data may be sparse and irregularly sampled multivariate time series data. In an example, the time series data may be inputted from dataset 106. In other examples, the time series data may be from other suitable data sources. For example, the time series data can be data from clinical, climate, financial and many other domains. A number of time series applications may naturally produce missing values. Examples include electronic health records consisting of patient visits where every possible test is not reported during every visit perhaps due to the costs of running healthcare tests or because tests can be invasive and patient may not want to endure the tests. Other examples include climate/weather data, ecology, and astronomy. For example, in a climate measurement environment, e.g., in a lab, a number of sensors can be located across the lab. Each sensor may report a number of attributes, e.g., temperature, humidity, light and voltage of the battery in the sensor. Each time a sensor reports, the sensor may report the value of all four attributes, but different sensors may report their attributes independently. In other words, it is not immediately clear which sensors' reporting patterns are correlated. Moreover, sensors can break. The time series data measured by the sensors may have missing values. An example time series data is further illustrated in FIG. 2.

In an example, the time series data can be data, for example, including D variables. An autoregression hyperparameter AR may be configured for recurrent neural network 110. N denotes the length of the sequence data (number of time steps), and the data at each $i \in \{1, \ldots, N\}$ constitutes a time series. The N time series may be obtained by taking AR steps of the D-dimensional data where each consecutive sequence overlaps on AR−1 common steps. Each time series i is measured at AR time points specified by a vector of observation times $t_i \in \mathbb{R}_+^{AR}$. $S_t \in \mathbb{R}_+$ denotes the time-stamp when the $t^{th}$ observation is obtained. The first observation may be made at time-stamp 0 (i.e., $s_1 = 0$). The values of these observations may be specified by a matrix of observations $x_i \in \mathbb{R}^{AR \times D}$, an observation mask $m_i \in \{0, 1\}^{AR \times D}$ and a matrix $\Delta_i \in \mathbb{R}_+^{AR+D}$ specifying the time difference between each observation of a variable. For example, for a given D-dimensional time series x of length AR, data forecasting module 104 may determine the respective values of the $d^{th}$ dimension at time step t as follows:

$$m_t^d = \begin{cases} 1, & \text{if } x_t^d \text{ is observed} \\ 0, & \text{otherwise} \end{cases}$$

$$\Delta_t^d = \begin{cases} s_t - s_{t-1} + \Delta_{t-1}^d, & t > 1, \; m_{t-1}^d = 0 \\ s_t - s_{t-1}, & t > 1, \; m_{t-1}^d = 1 \\ 0, & t = 1 \end{cases}$$

where both $m_t^d$ and $\Delta_t^d$ are scalars and stand for the respective values of the $d^{th}$ dimension at time step t.

In one or more embodiments, data forecasting module 104 is configured to determine, from the time series data, non-missing values present in the time series data. For an example D-dimensional time series x of length AR, data forecasting module 104 may determine the non-missing values by taking AR steps of the D-dimensional data where each consecutive sequence overlaps on AR−1 common steps.

In one or more embodiments, data forecasting module 104 is configured to determine, from the time series data, zero or more mask values for the time series data. For example, for a given D-dimensional time series x of length AR, data forecasting module 104 may determine the zero or more mask values using the following formula:

$$m_t^d = \begin{cases} 1, & \text{if } x_t^d \text{ is observed} \\ 0, & \text{otherwise} \end{cases}$$

where $m_t^d$ is scalar and stands for the respective values of the $d^{th}$ dimension at time step t.

In one or more embodiments, data forecasting module 104 is configured to determine time interval values. For example, for a given D-dimensional time series x of length AR, data forecasting module 104 may determine the time interval values using the following formula:

$$\Delta_t^d = \begin{cases} s_t - s_{t-1} + \Delta_{t-1}^d, & t > 1, \; m_{t-1}^d = 0 \\ s_t - s_{t-1}, & t > 1, \; m_{t-1}^d = 1 \\ 0, & t = 1 \end{cases}$$

where $\Delta_t^d$ is scalar and stands for the respective values of the $d^{th}$ dimension at time step t.

Figure 4:
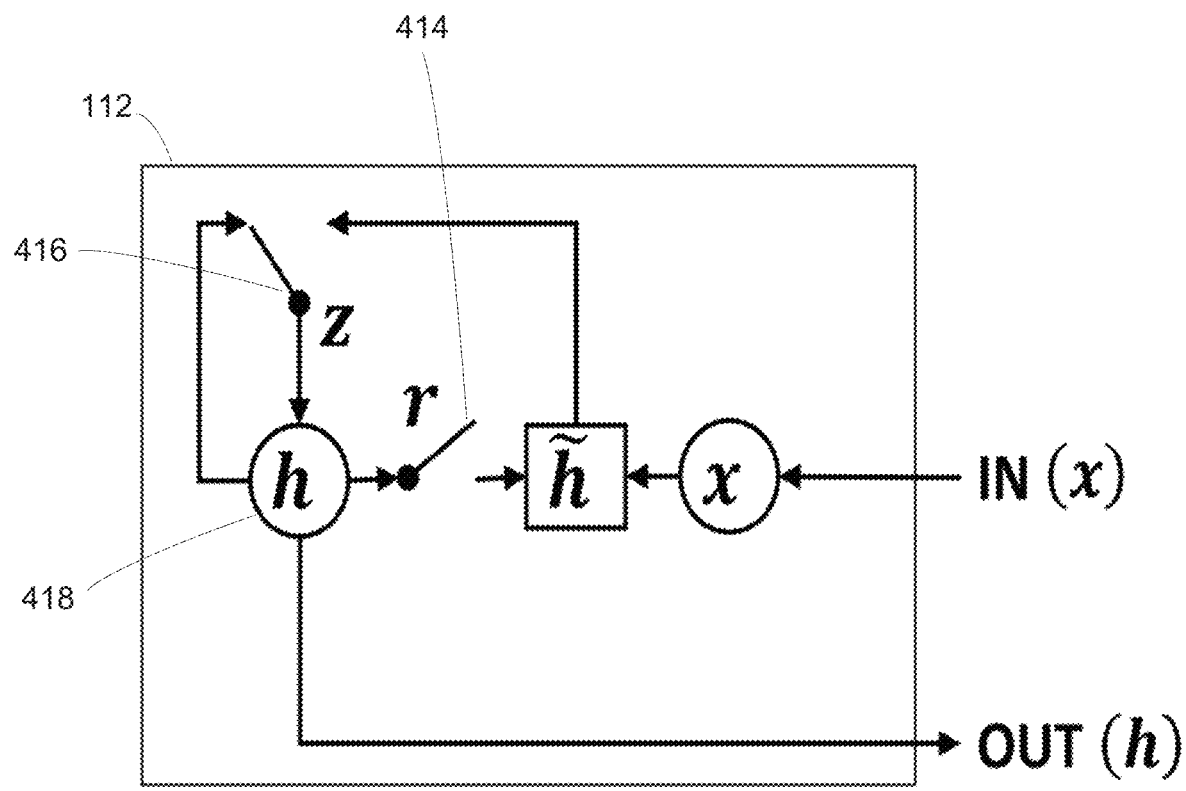
FIG. 4 illustrates an example structure of a gated recurrent unit in the computing device of FIG. 1, in accordance with an embodiment of the present disclosure.

In one or more embodiments, data forecasting module 104 is configured to input the one or more missing values, the non-missing values, the zero or more mask values, and the time interval values into recurrent neural network 110. Recurrent neural network may be a class of artificial neural networks where connections between nodes form a directed graph along a temporal sequence. In the depicted embodiment, recurrent neural network 110 includes gated recurrent unit(s) 112. An example of gated recurrent unit(s) 112 is illustrated in FIG. 4. In other embodiments, recurrent neural network 110 may be a long short-term memory network or another suitable artificial neural network. Recurrent neural network 110 may have properties such as strong prediction performance as well as the ability to capture long-term temporal dependencies (e.g., seasonality) and variable-length observations. Recurrent neural network 110 may exploit the correlation between the variables and also capture the seasonality in the time series data.

In one or more embodiments, data forecasting module 104 is configured to determine a predicted value for the one or more missing values. In an embodiment, data forecasting module 104 may determine not only the predicted value but also the time at which the value is expected to occur. Data forecasting module 104 may predict the value $v_n \in \mathbb{R}^D$ given the time series data D, where $D = \{(x_n, \Delta_n, m_n)\}_{n=1}^N$. For example, data forecasting module 104 may take AR consecutive time-steps from the t, vector with the corresponding $m_i$, $x_i$ and $\Delta_i$ concatenated as the input to gated recurrent unit(s) 112. The target vector is the concatenation of $x_i$ and $\Delta_i$ for the next time-step. More specifically, $$x_i = [x_i; m_i; \Delta_i]$$

The missing values are imputed using forward imputation. More formally, for a given sequence x, $$x_t^d = m_t^d x_t^d + (1 - m_t^d)x_{t'}^d$$

where t'<t is the last time the $d^{th}$ variable was observed.

In one embodiment, data forecasting module 104 may use a custom loss function which optimizes over the present values. For example, data forecasting module 104 may consider recurrent neural network 110 as a function $f_\theta$ parameterized on $\theta$. The output $\hat{y}_n = f_\theta(x_n)$. The loss for the $i^{th}$ input sequence is $$l_i = m_i * L(y_i, \hat{y}_i)$$

where L is chosen to be a Huber loss in order to minimize a mean absolute error. The same loss function can be used for a delta prediction layer.

In one or more embodiments, data forecasting module 104 is configured to receive a query regarding the time series data. Data forecasting module may respond to the query using the determined predicted value.

Figure 2:
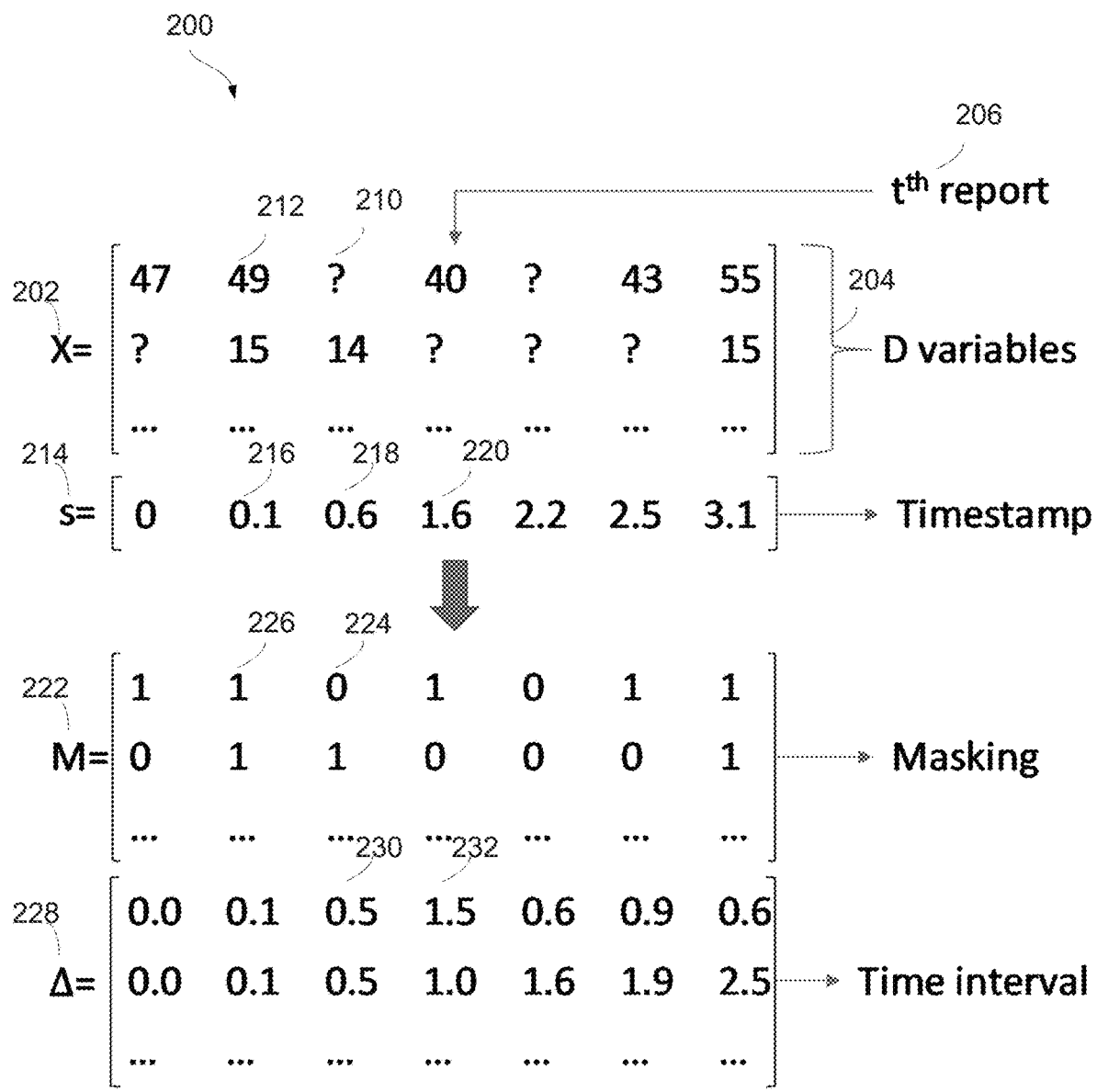
FIG. 2 illustrates an example of time series data for a data forecasting module in a computing device of FIG. 1, in accordance with an embodiment of the present disclosure.

FIG. 2 illustrates an example of time series data 200 for data forecasting module 104, in accordance with an embodiment of the present disclosure.

In the example of FIG. 2, time series data 200 is represented by matrix "X" 202 with associated timestamp "s" 214. Time series data 200 has D variables 204. Values for D variables 204 at each timestamp may be reported and presented as indicated as "$t^{th}$ report" 206. Missing values in time series data 200 are marked as question marks "?". For example, at timestamp "0.6" 218, a value is missing and marked with question mark "?" 210. Non-missing values are displayed with actual values. For example, at timestamp "0.1" 216, value "49" 212 is an actual value reported.

In the example of FIG. 2, data forecasting module 104 determines, from time series data 200, mask values for time series data 200. For example, data forecasting module 104 may determine the mask values using the following formula:

$$m_t^d = \begin{cases} 1, & \text{if } x_t^d \text{ is observed} \\ 0, & \text{otherwise} \end{cases}$$

where $m_t^d$ is scalar and stands for the respective values of the $d^{th}$ dimension at time step t. The mask values are illustrated in matrix M 222. Data forecasting module 104 determines the mask values to be "1" for data with actual values. Data forecasting module 104 determines the mask values to be "0" for data with no actual value (i.e., with question mark "?" as shown in matrix "X' 202). For example, as 210 in time series data 200 is marked "?" and has no value, data forecasting module 104 determines the mask value for 210 to be "0" 224. In another example, as 212 in time series data 200 and has an actual value, data forecasting module 104 determines the mask value for 212 to be "1" 226.

In the example of FIG. 2, data forecasting module 104 may determine the time interval values using the following formula:

$$\Delta_t^d = \begin{cases} s_t - s_{t-1} + \Delta_{t-1}^d, & t > 1, m_{t-1}^d = 0 \\ s_t - s_{t-1}, & t > 1, m_{t-1}^d = 1 \\ 0, & t = 1 \end{cases}$$

where $\Delta_t^d$ is scalar and stands for the respective values of the $d^{th}$ dimension at time step t. The time interval values are illustrated in matrix $\Delta$ 228. For example, in determining a time interval value for 230, data forecasting module 104 determines the prior mask value as "1" 226. Data forecasting module 104 calculates the time interval value for 230 as "0.5" by using timestamp "0.6" 218 minus "0.1" 216. In another example, in determining a time interval value for 232, data forecasting module 104 determines the prior mask value as "0" 224. Data forecasting module 104 calculates the time interval value for 232 as "1.5" by using timestamp "1.6" 220 minus "0.6" 218 plus prior time interval "0.5" 230.

Figure 3:
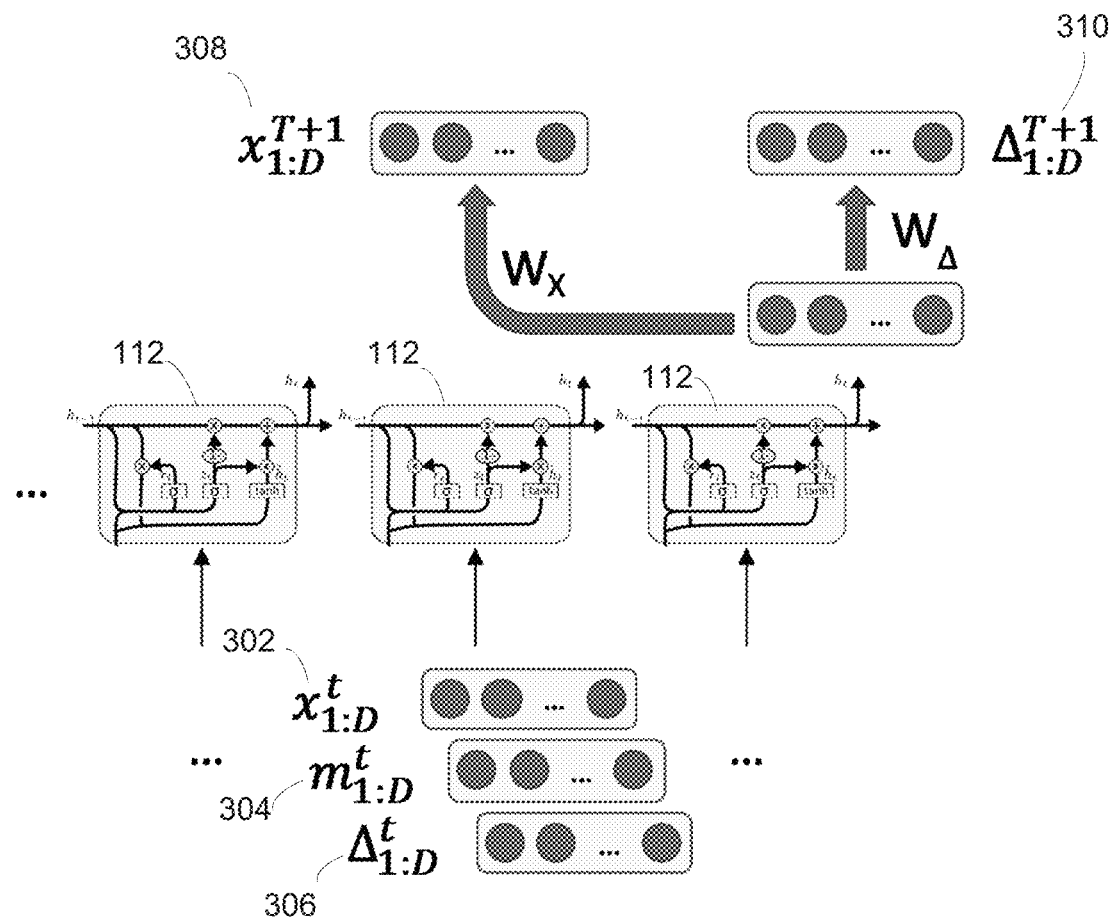
FIG. 3 illustrates an example of the data forecasting module in the computing device of FIG. 1, in accordance with an embodiment of the present disclosure.

FIG. 3 illustrates an example of data forecasting module 104, in accordance with an embodiment of the present disclosure.

In the example of FIG. 3, data forecasting module 104 includes gated recurrent unit(s) 112. Input to invoke gated recurrent unit(s) 112 is a combination of values 302, mask values 304, and time interval values 306. Values 302 may include non-missing and missing values. Gated recurrent unit(s) 112 may determine and output predicted value 308 for next report. Gated recurrent unit(s) 112 may determine and output the predicted time (time difference from the previous report) for next report. For example, data forecasting module 104 may take AR consecutive time-steps from the $t_i$ vector with the corresponding $m_i$, $x_i$ and $\Delta_i$ concatenated as the input to gated recurrent unit(s) 112. The target vector is the concatenation of $x_i$ and $\Delta_i$ for the next time-step. More specifically, $$x_i = [x_i; m_i; \Delta_i]$$

The missing values are imputed using forward imputation. More formally, for a given sequence x, $$x_t^d = m_t^d x_t^d + (1 - m_t^d)x_{t'}^d$$

where t'<t is the last time the $d^{th}$ variable was observed.

FIG. 4 illustrates an example structure of gated recurrent unit(s) 112, in accordance with an embodiment of the present disclosure.

In the example structure of gated recurrent unit(s) 112, for each j-th hidden unit, gated recurrent unit 112 has reset gate $r_t^j$ 414 and update gate $z_t^j$ 416 to control hidden state $h_t^j$ at each time t. The update functions are:

$$r_t = \sigma(W_r x_t + U_r h_{t-1} + b_r)$$

$$z_t = \sigma(W_z x_t + U_z h_{t-1} + b_z)$$

$$\tilde{h}_t = \tanh(W x_t + U(r_t * h_{t-1}) + b)$$

$$h_t = (1 - z_t) * h_{t-1} + z_t * \tilde{h}_t$$

where matrices $W_z$, $W_r$, W, $U_z$, $U_r$, U and vectors $b_z$, $b_r$, b are model parameters. Here $\sigma$ represents element-wise sigmoid function, and * stands for element-wise multiplication. The inputs may be observed. The missing values can be either explicitly or implicitly imputed. Depending on the task, either classification or regression, an appropriate last layer, sigmoid/soft-max or dense respectively, is applied on the output of gated recurrent unit(s) 112 at the last time step.

Figure 5:
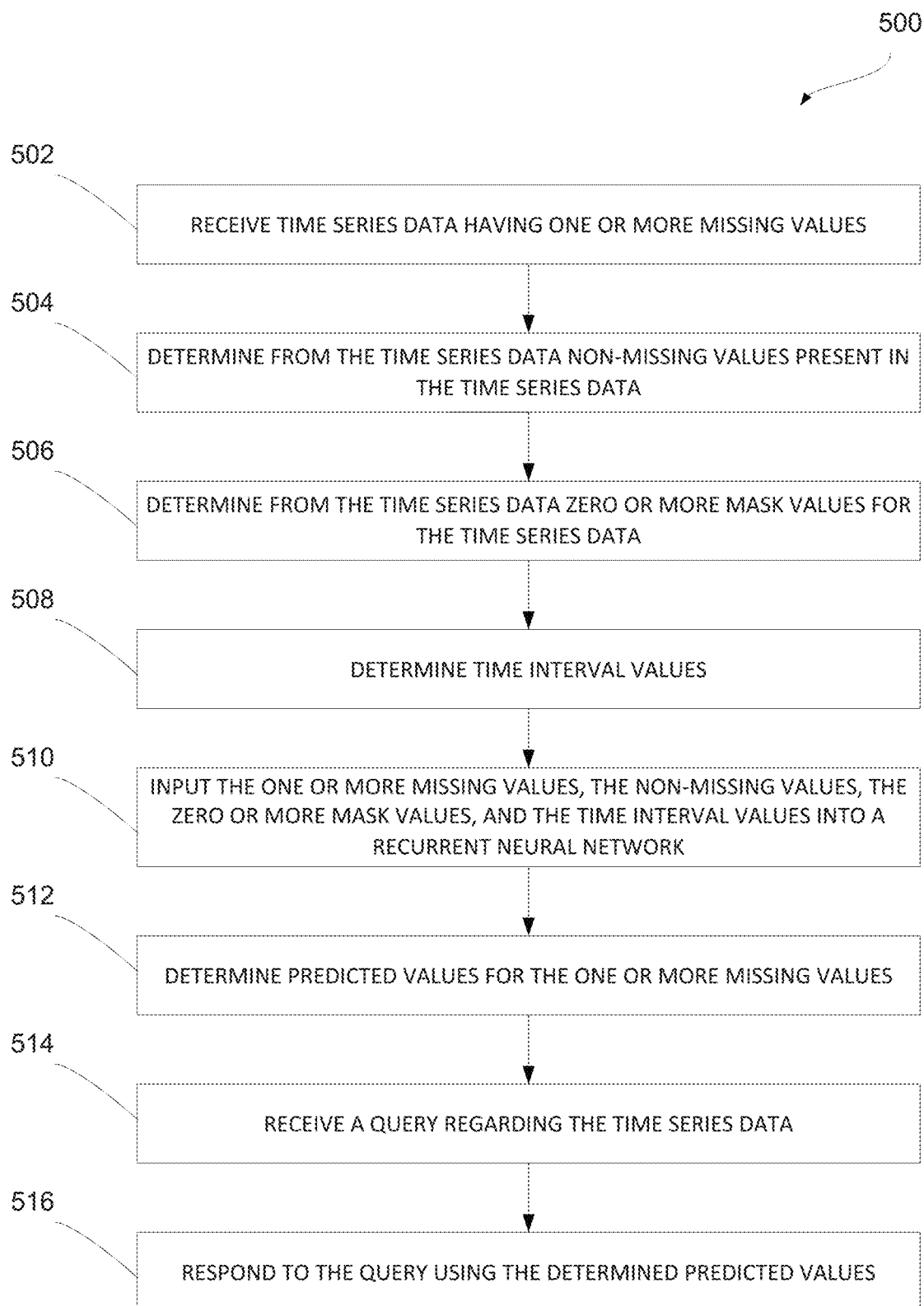
FIG. 5 is a flowchart depicting operational steps of the data forecasting module included in the computing device of FIG. 1, in accordance with an embodiment of the present disclosure.

FIG. 5 is a flowchart 500 depicting operational steps of data forecasting module 104 in accordance with an embodiment of the present disclosure.

Data forecasting module 104 operates to receive time series data having one or more missing values. Data forecasting module 104 also operates to determine from the time series data non-missing values present in the time series data. Data forecasting module 104 operates to determine, from the time series data, zero or more mask values for the time series data. Data forecasting module 104 operates to determine time interval values. Data forecasting module 104 operates to input the one or more missing values, the non-missing values, the zero or more mask values, and the time interval values into recurrent neural network 110. Data forecasting module 104 operates to determine a predicted value for the one or more missing values. Data forecasting module 104 operates to receive a query regarding the time series data. Data forecasting module 104 operates to respond to the query using the determined predicted value.

In step 502, data forecasting module 104 receives time series data having one or more missing values. The time series data may be sparse and irregularly sampled multivariate time series data. In an example, the time series data may be inputted from dataset 106. In other examples, the time series data may be from other suitable data sources. For example, the time series data can be data from clinical, climate, financial and many other domains. A number of time series applications may naturally produce missing values. Examples include electronic health records consisting of patient visits where every possible test is not reported during every visit perhaps due to the costs of running healthcare tests. Other examples include climate/weather data, ecology, and astronomy. For example, in a climate measurement environment, e.g., in a lab, a number of sensors can be located across the lab. Each sensor may report a number of attributes, e.g., temperature, humidity, light and voltage of the battery in the sensor. Each time a sensor reports, the sensor may report the value of all four attributes, but different sensors may report their attributes independently. In other words, sensors' reporting patterns may not be correlated. Moreover, sensors can break. The time series data measured by the sensors may have missing values.

In an example, the time series data can be data, for example, including D variables. $\Delta_n$ autoregression hyperparameter AR may be configured for recurrent neural network 110. N denotes the length of the sequence data (number of time steps), and the data at each $i \in \{1, \ldots, N\}$ constitutes a time series. The N time series may be obtained by taking AR steps of the D-dimensional data where each consecutive sequence overlaps on AR−1 common steps. Each time series i is measured at AR time points specified by a vector of observation times $t_i \in \mathbb{R}_+^{AR}$. $S_t \in \mathbb{R}_+$ denotes the time-stamp when the $t^{th}$ observation is obtained. The first observation may be made at time-stamp 0 (i.e., $s_1 = 0$). The values of these observations may be specified by a matrix of observations $x_i \in \mathbb{R}^{AR \times D}$, an observation mask $m_i \in \{0, 1\}^{AR \times D}$, and a matrix $\Delta_i \in \mathbb{R}_+^{AR+D}$ specifying the time difference between each observation of a variable. For example, for a given D-dimensional time series x of length AR, data forecasting module 104 may determine the respective values of the $d^{th}$ dimension at time step t as follows:

$$m_t^d = \begin{cases} 1, & \text{if } x_t^d \text{ is observed} \\ 0, & \text{otherwise} \end{cases}$$

$$\Delta_t^d = \begin{cases} s_t - s_{t-1} + \Delta_{t-1}^d, & t > 1, \; m_{t-1}^d = 0 \\ s_t - s_{t-1}, & t > 1, \; m_{t-1}^d = 1 \\ 0, & t = 1 \end{cases}$$

where both $m_t^d$ and $\Delta_t^d$ are scalars and stand for the respective values of the $d^{th}$ dimension at time step t.

In step 504, data forecasting module 104 determines, from the time series data, non-missing values present in the time series data. For an example D-dimensional time series x of length AR, data forecasting module 104 may determine the non-missing values by taking AR steps of the D-dimensional data where each consecutive sequence overlaps on AR−1 common steps.

In step 506, data forecasting module 104 determines, from the time series data, zero or more mask values for the time series data. For example, for a given D-dimensional time series x of length AR, data forecasting module 104 may determine the zero or more mask values using the following formula:

$$m_t^d = \begin{cases} 1, & \text{if } x_t^d \text{ is observed} \\ 0, & \text{otherwise} \end{cases}$$

where $m_t^d$ is scalar and stands for the respective values of the $d^{th}$ dimension at time step t.

In step 508, data forecasting module 104 determines time interval values. For example, for a given D-dimensional time series x of length AR, data forecasting module 104 may determine the time interval values using the following formula:

$$\Delta_t^d = \begin{cases} s_t - s_{t-1} + \Delta_{t-1}^d, & t > 1, \; m_{t-1}^d = 0 \\ s_t - s_{t-1}, & t > 1, \; m_{t-1}^d = 1 \\ 0, & t = 1 \end{cases}$$

where $\Delta_t^d$ is scalar and stands for the respective values of the $d^{th}$ dimension at time step t.

In step 510, data forecasting module 104 inputs the one or more missing values, the non-missing values, the zero or more mask values, and the time interval values into recurrent neural network 110. Recurrent neural network may be a class of artificial neural networks where connections between nodes form a directed graph along a temporal sequence. In the depicted embodiment, recurrent neural network 110 includes gated recurrent unit(s) 112. In other embodiments, recurrent neural network 110 may be a long short-term memory network or another suitable artificial neural network. Recurrent neural network 110 may have properties such as strong prediction performance as well as the ability to capture long-term temporal dependencies (e.g., seasonality) and variable-length observations. Recurrent neural network 110 may exploit the correlation between the variables and also capture the seasonality in the time series data.

In step 512, data forecasting module 104 determines a predicted value for the one or more missing values. In an embodiment, data forecasting module 104 may determine not only the predicted value but also the time at which the value is expected to occur. Data forecasting module 104 may predict the value $v_i \in RD$ given the time series data D, where $D = \{(x_n, \Delta_n, m_n)\}_{n=1}^N$. For example, data forecasting module 104 may take AR consecutive time-steps from the t, vector with the corresponding $m_i$, $x_i$ and $\Delta_i$ concatenated as the input to gated recurrent unit(s) 112. The target vector is the concatenation of $x_i$ and $\Delta_i$ for the next time-step. More specifically, $$x_i = [x_i; m_i; \Delta_i]$$

The missing values are imputed using forward imputation. More formally, for a given sequence x, $$x_t^d = m_t^d x_t^d + (1 - m_t^d) x_{t'}^d$$

where $t' < t$ is the last time the $d^{th}$ variable was observed.

In one embodiment, data forecasting module 104 may use a custom loss function which optimizes over the present values. For example, data forecasting module 104 may consider recurrent neural network 110 as a function $f_\theta$ parameterized on $\theta$. The output $\hat{y}_n = f_\theta(x_n)$. The loss for the $i^{th}$ input sequence is $$l_i = m_i * L(y_i, \hat{y}_i)$$

where L is chosen to be a Huber loss in order to minimize a mean absolute error. The same loss function can be used for a delta prediction layer.

In step 514, data forecasting module 104 receives a query regarding the time series data. In step 516, data forecasting module 104 responds to the query using the determined predicted value.

Figure 6:
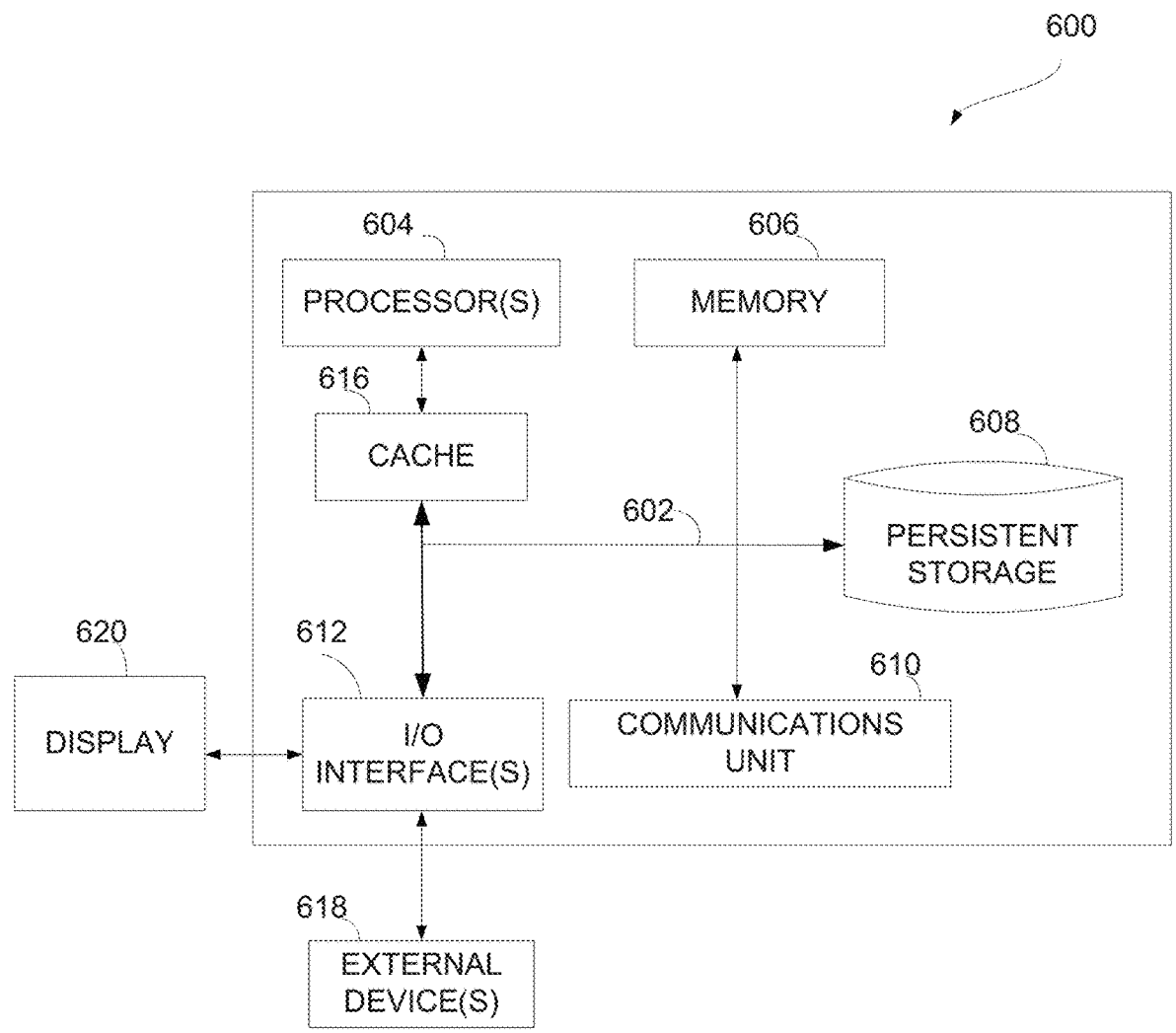
FIG. 6 is a block diagram of components of the computing device of FIG. 1, in accordance with an embodiment of the present disclosure.

FIG. 6 depicts a block diagram 600 of components of computing device 102 in accordance with an illustrative embodiment of the present disclosure. It should be appreciated that FIG. 6 provides only an illustration of one implementation and does not imply any limitations with regard to the environments in which different embodiments may be implemented. Many modifications to the depicted environment may be made.

Computing device 102 may include communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Data forecasting module 104 may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Data forecasting module 104 may be downloaded to persistent storage 608 through communications unit 610.

I/O interface(s) 612 allows for input and output of data with other devices that may be connected to computing device 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., data forecasting module 104 can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for forecasting in multivariate irregularity, the method comprising:
   receiving, by one or more processors, time series data having one or more missing values;
   determining, by one or more processors, from the time series data, non-missing values present in the time series data;
   determining, by one or more processors, from the time series data, zero or more mask values for the time series data;
   determining, by one or more processors, time interval values;
   inputting, by one or more processors, the one or more missing values, the non-missing values, the zero or more mask values, and the time interval values into a recurrent neural network configured to capture seasonality across a temporal sequence; and
   determining, by one or more processors, a predicted value for the one or more missing values across the temporal sequence.

2. The computer-implemented method of claim 1, wherein determining the predicted value includes determining a time at which the predicted value is expected to occur.

3. The computer-implemented method of claim 1, wherein determining the predicted value includes imputing the one or more missing values using a forward imputation.

4. The computer-implemented method of claim 1, further comprising:
   receiving, by one or more processors, a query regarding the time series data; and
   responding, by one or more processors, to the query using the determined predicted value.

5. The computer-implemented method of claim 1, wherein the recurrent neural network includes a gated recurrent unit.

6. The computer-implemented method of claim 5, wherein the gated recurrent unit includes a custom loss function which optimizes over a present value in the time series data.

7. The computer-implemented method of claim 1, wherein the recurrent neural network is a long short-term memory network.

8. A computer program product for forecasting in multivariate irregularity comprising:
   one or more computer readable storage media, and program instructions collectively stored on the one or more computer readable storage media, the program instructions comprising:
      program instructions to receive time series data having one or more missing values;
      program instructions to determine, from the time series data, non-missing values present in the time series data;
      program instructions to determine, from the time series data, zero or more mask values for the time series data;
      program instructions to determine time interval values;
      program instructions to input the one or more missing values, the non-missing values, the zero or more mask values, and the time interval values into a recurrent neural network configured to capture seasonality across a temporal sequence; and
      program instructions to determine a predicted value for the one or more missing values across the temporal sequence.

9. The computer program product of claim 8, wherein program instructions to determine the predicted value include program instructions to determine a time at which the predicted value is expected to occur.

10. The computer program product of claim 8, wherein program instructions to determine the predicted value include program instructions to impute the one or more missing values using a forward imputation.

11. The computer program product of claim 8, further comprising:
   program instructions, stored on the one or more computer-readable storage media, to receive a query regarding the time series data, and program instructions, stored on the one or more computer-readable storage media, to respond to the query using the determined predicted value.

12. The computer program product of claim 8, wherein the recurrent neural network includes a gated recurrent unit.

13. The computer program product of claim 12, wherein the gated recurrent unit includes a custom loss function which optimizes over a present value in the time series data.

14. The computer program product of claim 8, wherein the recurrent neural network is a long short-term memory network.

15. A computer system for forecasting in multivariate irregularity comprising:
   one or more computer processors, one or more computer readable storage media, and program instructions stored on the one or more computer readable storage media for execution by at least one of the one or more computer processors, the program instructions comprising:
      program instructions to receive time series data having one or more missing values;
      program instructions to determine, from the time series data, non-missing values present in the time series data;
      program instructions to determine, from the time series data, zero or more mask values for the time series data;
      program instructions to determine time interval values;
      program instructions to input the one or more missing values, the non-missing values, the zero or more mask values, and the time interval values into a recurrent neural network configured to capture seasonality across a temporal sequence; and
      program instructions to determine a predicted value for the one or more missing values across the temporal sequence.

16. The computer system of claim 15, wherein program instructions to determine the predicted value include program instructions to determine a time at which the predicted value is expected to occur.

17. The computer system of claim 15, wherein program instructions to determine the predicted value include program instructions to impute the one or more missing values using a forward imputation.

18. The computer system of claim 15, further comprising:
   program instructions, stored on the one or more computer-readable storage media, to receive a query regarding the time series data, and program instructions, stored on the one or more computer-readable storage media, to respond to the query using the determined predicted value.

19. The computer system of claim 15, wherein the recurrent neural network includes a gated recurrent unit.

20. The computer system of claim 19, wherein the gated recurrent unit includes a custom loss function which optimizes over a present value in the time series data.

* * * * *